United States Patent [19]

Gjelsvik et al.

[11] 4,367,215

[45] Jan. 4, 1983

[54] METHOD OF ACID LEACHING OF SILICATES

[75] Inventors: Norvald Gjelsvik, Oslo; Jan H. Torgersen, Skjetten, both of Norway

[73] Assignee: Elkem a/s, Oslo, Norway

[21] Appl. No.: 212,402

[22] Filed: Dec. 3, 1980

Related U.S. Application Data

[63] Continuation-in-part of Ser. No. 118,582, Feb. 4, 1980, abandoned.

[30] Foreign Application Priority Data

Feb. 13, 1979 [NO] Norway ............................ 790459

[51] Int. Cl.$^3$ .................. B01D 11/00; B01F 1/00
[52] U.S. Cl. .................. 423/658.5; 423/132; 423/150; 423/155; 423/335
[58] Field of Search .............. 423/132, 150, 658.5, 423/335, 155

[56] References Cited

U.S. PATENT DOCUMENTS

| | | |
|---|---|---|
| 2,105,456 | 1/1938 | Hubler et al. |
| 3,461,030 | 6/1976 | Wiewiorowski et al. ........... 423/132 |
| 4,017,309 | 4/1977 | Johnson ................................ 423/41 |
| 4,069,296 | 1/1978 | Huang .................................. 423/132 |
| 4,110,399 | 8/1978 | Gaudernack et al. .............. 423/132 |
| 4,230,765 | 10/1980 | Takahashi et al. ................. 423/335 |

FOREIGN PATENT DOCUMENTS 1293230 10/1972 United Kingdom.
1328248 8/1973 United Kingdom.

OTHER PUBLICATIONS

Perry, Ed., "Chemical Engineer's Handbook", 4th Ed., 1963, pp. 21–51, McGraw-Hill Book Co., N.Y.
Smith et al., "The Chemical Engineer", Dec. 1972, pp. 440–444.
Mining & Extraction of Copper al Lo Aguirre, Chile, Mining Magazine, Jul. 1978, pp. 33–37.
New TL Leaching Process, E/MJ–Oct., 1978, pp. 100–102.

*Primary Examiner*—Herbert T. Carter
*Attorney, Agent, or Firm*—Eyre, Mann, Lucas & Just

[57] ABSTRACT

A method of leaching of the metal contents in natural silicates by means of mineral acids to produce a metal-containing leaching liquid and a solid residue is disclosed. The silicate is first crushed but the grain size of substantially all of it is kept above 0.1 mm. It is then leached for a period of time sufficient to form a solid residue consisting chiefly of silica. The process is controlled so that the grains do not change in size or shape in the course of the leaching process. The silicate to be leached may be anorthosite or olivinrich rock and the solid residue from the leaching process may be utilized for building material, as a source for silicon in industrial processes, as a catalyst or carrier of catalysts or as an absorbent.

8 Claims, No Drawings

METHOD OF ACID LEACHING OF SILICATES

This application is a continuation-in-part of Ser. No. 118,582, filed Feb. 4, 1980 and now abandoned.

The present invention relates to the leaching of silicates by means of mineral acid. Leaching means transferring a smaller part of a solid material to solution while the greater part remains undissolved. It is thus possible to separate the desired components from the undesired ones by a liquid-solid-separation, usually filtration. When leaching mineral silicates, it is usually desired to bring a valuable metal component into solution, while the silicon and other undesired metals remain as solid materials in as high a degree as possible.

With silicates, however, there often arise complications in connection with the filtration because of the chemical properties of silicon in solution. Acid treatment of a mineral silicate will often result in part of the silicon being dissolved and forming a gel which makes filtration difficult and sometimes even impossible. Another problem with the formation of gel is that a small amount of silica will bind a comparatively large amount of liquid so that even if it is possible to filter the leached material, the filter cake will contain considerable solution which can be difficult to separate from the cake in subsequent operations.

It has been found that the amount of silicate in solution is greatest just after the acid and the silicates are brought into contact. The concentration of dissolved silicon will then decrease. For example, it has been found that after 30 minutes contact time the concentration of silicon in the solution will typically be only 1/10 of what it was after 5 minutes' contact time. This relationship holds true even if only a small part of the mineral grain is leached and even though the concentration of the metal ion continues to rise at the same time.

It has been theorized that the acid will initially attack the surface of the mineral grains, and a part of the surface atoms will be dissolved, both the metal ions and the silicon. The latter will then precipitate again and form the detrimental silica gel. Depending on the crystallinity and chemical properties of the actual silicates, greater or small amounts of silicon will be dissolved from the surface of the separate mineral grains. When the content of dissolved silicon polymerizes, it precipitates again and a part will be precipitated on the surface of the undissolved mineral grains. There will thus be formed a film of silica gel on the surface of the mineral grains. H+ from the leaching acid must then diffuse inwardly to the unattacked parts of the mineral grains in order to cause the metal ions in the crystal lattice to be liberated. The metal ions must also be able to diffuse through the silica gel out into the leaching fluid. The silicon-oxygen-bonds in the crystal lattice are, however, resistant to attack by the H+ ions, and tend to polymerize together with other silicon-oxygen-groups. Even if the liberated silicon ions are not polymerized immediately they will still, because of their size, not be able to diffuse rapidly through the mentioned layer of silica. They thus remain captured within the layer of precipitated silica gel long enough to polymerize and be bonded to the separate mineral grains. It would then be expected that the layer of silica around each mineral grain would reduce the leaching speed so much that it would prevent commercial leaching after the above mentioned film has been formed.

It has surprisingly been found that this is not the case, as is demonstrated by the following test: Anorthosite from Sogn with 50% $SiO_2$, 30.5% $Al_2O_3$, 14.7% CaO, 3.0% $Na_2O_3$ and 1% $Fe_2O_3$ was crushed and leached in 6 N HCl at 105° C. After predetermined periods of time some anorthosite grains were taken out. These were divided into two parts with a diamond saw and one could then clearly see a white zone around each grain. The white zone penetrated deeper into the grains with the longer treatment periods and, depending on the size of the grain and the treatment period, they even penetrated into the center of the grain. Microscopic and chemical investigations showed that the white zones corresponded to parts of the grains in which almost all metallical elements with the exception of silicon had been removed. The degree of leaching can thus be simply determined by determining the width of the white zones. It has been found that the formation of a film of silicon residue surrounding the grains does not reduce the leaching speed to any important degree. The formation of such film is therefore not detrimental, but has rather been found to be desirable because the separate grains maintain their outer shape and size. This means that only small amounts of silicon can penetrate into the leaching solution and thus the slimy silica gel is substantially avoided. It has been found that when the ratio between silicon and metal ions is such that there exist in the crystal lattice of the minerals groups of a number of silicon ions bonded to each other by means of oxygen bridges, the desired films of silica gel will be formed especially easily. The groups are so big that they can diffuse through the layer of silica only with difficulty. Furthermore, the outer parts of these groups will polymerize to the surrounding layer of silica before the inner part is liberated from the crystal lattice. The result is that the silicon ions in the crystal lattice in such minerals will keep their form to a remarkable degree even if the total content of ions other than silicon are removed from the crystal lattice of the minerals.

It has been found that it is possible to carry out the leaching of silicates with a minimal formation of the detrimental silica gel if the leaching is carried out with large size mineral grains so that the total surface area is as small as possible. This will give the lowest possibility for liberation of silicon into the solution during the first part of the leaching process i.e. that time before silica is precipitated on the surface of the mineral grains and prevents the further liberation of silicon from the grains. Thus, only a small amount of the free slimy silica gel which causes filtration difficulties is precipitated. The improved filtration obtained by use of larger grains sizes is not a result of coarse grained materials being easier to filter, but is because there is much less free silica gel. A special benefit of the present invention is that conventional filtration can be eliminated completely in most instances because it is possible to drain off the leaching liquid from the solid components.

The large size grains of the present invention are defined as at least about 90% and preferably 95% of the particles having a diameter of at least 0.1 mm and preferably above 0.3 mm. Since the degree of agitation normally used in these leaching processes can break down the grains, agitation must be carefully controlled throughout the process. In particular, the degree of agitation must be controlled to be very minor so that at least about 90% and preferably above 95% of the particles at the end of the leaching process have a diameter of at least 0.1 mm and preferably above 0.3 mm.

It has been found that agitation can be virtually eliminated by pumping or percolating the leach acid through the mass of crushed ore. This is especially advantageous with fragile substances such as clay. It is also quite advantageous in eliminating the need for filtering.

While it has been found that grains of large particle size should be used, this concept must be taken in context. If the particles are too large, the leaching process will be too slow. It has been found that, as a practical matter, particle size should not exceed 10 mm for more than 10% of the material and preferably at least 95% should be smaller than 5 mm in diameter.

It has also been found that the coarse leached material of the present invention has surprising solidity and strength as compared to the silica component remaining after known treatments. This is useful in the further treatment of the leached material and makes it also possible to use the leached residue for a variety of purposes, e.g. as building materials, in industrial processes such as ceramics manufacture, as a catalyst or a carrier for a catalyst.

EXAMPLE 1

Anorthosite with 50% $SiO_2$, 30.5% $Al_2O_3$, 14.7% CaO and 3% $Na_2O_3$ was crushed until it passed through a 5 mm sieve. The material was again sieved on a 0.3 mm sieve. The most fine grained material (i.e. through 0.3 mm) was leached with 6 N HCl for 2 hours at 105° C. with constant stirring. 89% of the aluminum content in the anothorosite had then been dissolved. After the leaching the material was filtered at 0.9 atmosphere. After 5 minutes, a filter cake of 10 mm thickness was formed. The filter cake was found to contain 21% of the amount of the leaching liquid. When deposited in water, the filter cake formed a sludge which sedimented very poorly and which would have created a serious pollution problem if disposed of at sea. The other fraction, i.e. through 5 mm and on 0.3 mm, was leached with the same amount of acid and under the same conditions except that there was no agitation and the leaching lasted for 24 hours. After this period 90% of the aluminium content had been dissolved. The leach solution was removed by draining of the free solution above and between the solid particles. There was obtained a separation of 92% of the leaching liquid from the solid residue. The solid residue was easily washed free of the remaining amount of leaching liquid. The solid residue was analyzed by physical and chemical examination methods and was found to consist chiefly of silica of amorphous structure. By heating to 1000° C. the water was gradually separated. Further investigation showed that untreated residue could be utilized as a drying medium in the same way as typical dry silica gel produced especially for this purpose.

The absorption capacity and speed was almost equal to that of commercial silica gel at water contents up to 50% relative humidity at 10° C. At higher humidities the absorption capacity was less, but this can be improved by heat treatment.

The residue can also be utilized where a reactive silicon-containing material is desired. For example, when combined with sodium hydroxide a water soluble sodium silicate corresponding to what is known as water glass was formed.

The product can also be used in the porcelain and cement industries. When the residue was used as a mineral aggregate in cement, a relatively light product was obtained which was suitable as building material. A small amount of cement with a large amount of residue gave a porous material with good thermal insulating properties.

The residue can be used as a catalyzer or as a carrier of another catalyzer. It can be used as an absorption medium for various organic materials dissolved in water. It acts as an excellent absorbent for methylene blue and other coloring materials and amines.

EXAMPLE 2

There was employed a serpentinified olivine (51% MgO, 0.5% NiO) from Northern-Norway which was crushed and divided into a coarse fraction −5 mm +0.3 mm and a fine fraction −0.3 mm. The coarse fraction was leached for 24 hours with 6 N HCl. 95% of the magnesium content and 80% of the nickel content had then been dissolved. 90% of the solution could be separated from the solid residue by decanting. The magnesium and nickel were recovered from the solution. The solid residue had similar properties to the residue obtained in Example 1. The particle size and shape after leaching was not noticeably different from the starting material. The fine fraction was leached for 2 hours as described for the fine fraction in Example 1 and filtered. It took ½ hour to form a filter cake 10 mm thick. It was very difficult to wash the filter cake. Only 65% of the leach solution was recovered by the filtration. The filter cake was slimy and difficult to handle.

EXAMPLE 3

A peridodite (53% MgO, 0.3% $NiO_2$) from Hordaland was treated as in Example 2. The leaching of the coarse fraction gave a yield of 90% after 8 hours. This shows that the separate minerals are not leached equally rapidly. The optimum leaching time and grain size must be adjusted in each separate case.

EXAMPLE 4

Anorthosite (50% $SiO_2$, 30.5% $Al_2O_3$, 14.7% CaO, 3% $Na_2O$) as in Example 1 was leached with 12 N HCl. The result of the leaching was comparable to what was obtained in Example 1, but the solid residue crumbled. However, the separate fragments had good mechanical strength and were easily filtered and could be disposed of without environmental consequences.

It will be understood that the claims are intended to cover all changes and modifications of the preferred embodiments herein chosen for illustration which do not depart from the spirit and scope of the invention.

What is claimed is:

1. A process of leaching metal ions from naturally-occurring mineral silicates which produce slimy silica gel when contacted with mineral acids capable of leaching metal ions from said silicates under normal leaching conditions comprising:
(a) crushing the said silicate to grains wherein at least about 90% of the grains have a minimum diameter of at least 0.1 mm;
(b) contacting said grains with said mineral acid such that the mineral acid penetrates into the crystal lattice structure of the silicate itself and extracts metal ions from the lattice structure of the silicate itself;
(c) controlling agitation throughout the process such that the particles maintain substantially the same particle size throughout the process whereby the silica gel formed due to the attack by hydrogen ions on the surface of the grains precipitates onto the surface of the said grains and forms a film of silica gel around the said grains which is resistant to attack by the hydrogen ions but which allows the hydrogen ions to diffuse through and continue to attack the metal ions in the crystalline lattice structure of the silicate and which allows the metal ions to diffuse into solution but hinders the silicon ions from diffusing into solution, thus substantially arresting the creation of slimy silica gel without deleteriously reducing the leaching speed; and (d) separating the leach liquid which contains the metal ions from the solid residue.

2. The method of claim 1 wherein at least about 90% of the grains are less than about 10 mm in diameter.

3. The method of claim 1 wherein at least about 95% of the grains are greater than 0.3 mm in diameter.

4. The method of claim 3 wherein at least about 95% of the grains are less than about 5 mm in diameter.

5. The method of claim 1 wherein the metal-containing leach liquid and the solid residue are separated without filtration.

6. The method of claim 5 wherein the separation is by decantation.

7. The method of claim 1 wherein the mineral acid is hydrochloric acid.

8. The method of claim 1 wherein the naturally occurring silicate is anorthosite or is rich in olivine.

* * * * *